US012810144B2

(12) United States Patent
Hoydis et al.

(10) Patent No.: US 12,810,144 B2
(45) Date of Patent: Nov. 24, 2026

(54) FAST RETRAINING OF FULLY FUSED NEURAL TRANSCEIVER COMPONENTS

(71) Applicant: NVIDIA Corporation, Santa Clara, CA (US)

(72) Inventors: Jakob Richard Hoydis, Paris (FR); Sebastian Cammerer, Tuebingen (DE); Alexander Georg Keller, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 1103 days.

(21) Appl. No.: 17/821,956

(22) Filed: Aug. 24, 2022

(65) Prior Publication Data

US 2023/0082536 A1 Mar. 16, 2023

Related U.S. Application Data

(60) Provisional application No. 63/238,496, filed on Aug. 30, 2021.

(51) Int. Cl.
*G06N 3/08* (2023.01)
*H04L 1/00* (2006.01)
*H04L 25/02* (2006.01)

(52) U.S. Cl.
CPC ............ *G06N 3/08* (2013.01); *H04L 1/0054* (2013.01); *H04L 25/0202* (2013.01)

(58) Field of Classification Search
CPC ...... G06N 3/08; H04L 1/0054; H04L 25/0202
See application file for complete search history.

(56) References Cited

U.S. PATENT DOCUMENTS

2019/0278574 A1* 9/2019 Ravishankar ....... G06F 16/9024
2022/0086057 A1* 3/2022 Pezeshki ............... H04W 72/23

FOREIGN PATENT DOCUMENTS

CN 109861942 A 6/2019

OTHER PUBLICATIONS

Balevi, Eren et al., "Massive MIMO Channel Estimation With an Untrained Deep Neural Network", Mar. 2020, IEEE, p. 2079-2090 (Year: 2020).*

(Continued)

*Primary Examiner* — Haimei Jiang
*Assistant Examiner* — Thomas Bernard Lane
(74) *Attorney, Agent, or Firm* — Leydig, Voit & Mayer, Ltd.

(57) ABSTRACT

A system, apparatus, and method are provided for performing fast re-training of fully fused neural networks configured to implement at least a portion of a transceiver. At least one of a demapping module, an equalization module, or a channel estimation module can be implemented, at least in part, using a fully fused neural network. The neural network can be trained online during operation by acquiring training data sets using a number of received frames of data. Re-training of the neural network is performed periodically to adapt the neural network to changing channel characteristics. In various embodiments, a neural demapper, a neural channel estimator, and a neural receiver are disclosed to replace or augment one or more components of the transceiver. In another embodiment, an auto-encoder can be implemented across a transmitter and receiver to replace most of the components of the transceiver, the auto-encoder being trained via an end-to-end learning algorithm.

24 Claims, 12 Drawing Sheets

(56) References Cited

OTHER PUBLICATIONS

Zhou, Zhou et al., "RCNet: Incorporating Structural Information Into Deep RNN for Online MIMO-OFDM Symbol Detection With Limited Training", Jan. 21, 2021, IEEE, p. 3524-3537 (Year: 2021).*
Cammerer, S., et al., "Trainable communication systems: Concepts and prototype,", 2020, IEEE Transactions on Communications, vol. 68, No. 9, p. 5489-5503 (Year: 2020).*
Shental, O., et al., "Maching LLRning: Learning to Softly Demodulate," IEEE Globecom Workshops (GC Wkshps), pp. 1-7, 2019.
Chen, Y., et al., "Turbo-AI, Part I: Iterative machine learning based channel estimation for 2d massive arrays," IEEE 93rd Vehicular Technology Conference (VTC2021—Spring), pp. 1-6, 2021.
Nachmani, E., et al., "Learning to decode linear codes using deep learning," 54th Annual Allerton Conference on Communication, Control, and Computing (Allerton), pp. 341-346, 2016.
Aoudia, F., et al., "End-to-end Learning for OFDM: From Neural Receivers to Pilotless Communication," arXiv e-prints, arXiv:2009.05261, Sep. 2020.
Cammerer, S., et al., "Trainable communication systems: Concepts and prototype," IEEE Transactions on Communications, vol. 68, No. 9, pp. 5489-5503, 2020.
Vaswani, A., et al., "Attention is all you need," in Advances in Neural Information Processing Systems, pp. 5998-6008, 2017.
Muller, T., et al., "Real-time neural radiance caching for path tracing," ACM Transactions on Graphics (Proceedings of SIGGRAPH), vol. 40, No. 4, pp. 36:1-36:16, Aug. 2021.
Finn, C., et al., "Model-agnostic meta-learning for fast adaptation of deep networks," in International Conference on Machine Learning, PMLR, pp. 1126-1135, 2017.
Nichol, A., et al., "On first-order meta-learning algorithms," arXiv preprint arXiv:1803.02999, 2018.
Zintgraf, L., et al., "Fast context adaptation via meta-learning," in International Conference on Machine Learning, PMLR, pp. 7693-7702, 2019.
Bicais, S., et al., "On the optimum demodulation in the presence of Gaussian phase noise," 25th International Conference on Telecommunications (ICT), IEEE, pp. 269-273, 2018.
Neumann, D., et al., "Learning the MMSE channel estimator," IEEE Transactions on Signal Processing, vol. 66, No. 11, pp. 2905-2917, 2018.
Turan, N., et al., "Learning the MMSE channel predictor," IEEE International Conference on Communications Workshops (ICC Workshops), pp. 1-6, 2020.
Ye, H., et al., "Power of deep learning for channel estimation and signal detection in OFDM systems," IEEE Wireless Communications Letters, vol. 7, No. 1, pp. 114-117, 2018.
Honkala, M., et al., "DeepRx: Fully convolutional deep learning receiver," IEEE Transactions on Wireless Communications, vol. 20, No. 6, pp. 3925-3940, 2021.
Mkadem, F., et al., "Physically inspired neural network model for RF power amplifier behavioral modeling and digital predistortion," IEEE Transactions on Microwave Theory and Techniques, vol. 59, No. 4, pp. 913-923, 2011.
Kurzo, Y., et al., "Design and implementation of a neural network aided self-interference cancellation scheme for full-duplex radios," 52nd Asilomar Conference on Signals, Systems, and Computers, pp. 589-593, 2018.

* cited by examiner

FAST RETRAINING OF FULLY FUSED NEURAL TRANSCEIVER COMPONENTS

CROSS-REFERENCE TO RELATED APPLICATIONS

This application claims the benefit of U.S. Provisional Application No. 63/238,496 titled "FAST RETRAINING OF FULLY FUSED NEURAL TRANSCEIVER COMPONENTS," filed Aug. 30, 2021, the entire contents of which is incorporated herein by reference BACKGROUND Neural networks (NNs) may be used to replace or augment signal processing blocks in transceivers for communication systems. In wireless communications, it is however widely believed that it is impossible to retrain such neural networks online for complexity and latency reasons. Thus, at most, training of the neural networks is performed offline prior to the neural networks being deployed in a device.

For example, it is believed to be difficult to accurately train a neural network to adjust to the characteristics of a channel that may change quickly and dramatically, especially when a user equipment including the transceiver is a mobile device such as a cellular phone. Things such as other sources of interference, the relative motion between the receiver and transmitter, and the number of independent signal paths between the transmitter and receiver can change in the real-world environment very rapidly. For example, a user talking on a cellular phone may suddenly walk into a subway station and board a train, which then accelerates away from or towards a transmitter. To alleviate such issues and allow the neural network to be as responsive as possible to as large a range of predicted channel responses as possible, the complexity of the neural network may be increased and/or the size of the training data set used during training may be quite large. However, increasing the complexity of the neural network only makes computation cost during inference negatively affect communication latency and energy efficiency, which may prove to be a limiting issue in telecommunications applications. Further, increasing complexity may also increase training time, which only exacerbates the online training issue. Thus, there is a need for addressing these issues and/or other issues associated with the prior art.

SUMMARY

A framework for implementing a fully fused neural network in a communications system is provided. Various embodiments of this disclosure provide for a method, system, and apparatus that includes at least one fully fused neural network.

In accordance with a first aspect of the disclosure, a communications apparatus is provided for communicating over a channel. The communications apparatus comprises a receiver. The communications apparatus further comprises a processor configured to implement, at least in part, a first neural network to perform a task associated with the receiver. The first neural network is re-trained periodically using a training data set comprising a number of frames of data received by the receiver over the channel. The first neural network comprises a fully fused neural network.

In an embodiment of the first aspect, the processor comprises a parallel processing unit configured to implement the fully fused neural network, at least in part, using one or more tensor cores.

In an embodiment of the first aspect, the first neural network comprises a multi-layer perceptron (MLP) comprising at least one hidden layer, an activation layer, and an output layer.

In an embodiment of the first aspect, the first neural network is configured to generate log likelihood ratios (LLRs) of transmitted bits based on equalized symbols of an orthogonal frequency division multiplexing (OFDM) frame received by the receiver over the channel. The OFDM frame consists of N subcarriers and K symbols per subcarrier.

In an embodiment of the first aspect, the first neural network comprises a multi-layer perceptron (MLP) configured to receive the equalized symbols $\hat{X}_{i,j}$ of the OFDM frame, a noise variance estimate $$\sigma_{i,j}^2$$

associated with each resource element of the OFDM frame, and a positional encoding p(i,j) of an index tuple (i,j) associated with each resource element as inputs. The MLP is configured to generate m LLRs for each equalized symbol of the OFDM frame, where $2^m$ is equal to an order of a constellation used in a quadrature amplitude modulation (QAM) modulation and coding scheme (MCS) used to communicate over the channel.

In an embodiment of the first aspect, the first neural network is re-trained periodically based on the training data set that comprises, for each OFDM frame of a plurality of OFDM frames, a set of tuples, each tuple in the set of tuples consisting of an equalized symbol for a particular resource element of the OFDM frame and corresponding valid bits for the equalized symbol. The corresponding valid bits are generated by encoding information bits using forward error correction (FEC), and the information bits are derived by a channel decoder based on the LLRs and confirmed as valid based on a cyclic redundancy check (CRC) using a last C bits of the information bits.

In an embodiment of the first aspect, the first neural network is re-trained periodically using stochastic gradient descent every $f$ OFDM frames, where $f$ is a positive integer. In an embodiment, the first neural network is re-trained at least once every 10 ms during operation of the receiver to receive a plurality of OFDM frames.

In an embodiment of the first aspect, the first neural network is configured to generate an estimate of a channel matrix based on a received resource grid of a t-th orthogonal frequency division multiplexing (OFDM) frame received by the receiver over the channel. The OFDM frame consists of N subcarriers and K symbols per subcarrier.

In an embodiment of the first aspect, the first neural network is configured to generate an estimate of a three-dimensional tensor that represents information bits based on a received resource grid of a t-th orthogonal frequency division multiplexing (OFDM) frame received by the receiver over the channel. The OFDM frame consists of N subcarriers and K symbols per subcarrier.

In an embodiment of the first aspect, the processor is further configured to implement, at least in part, a second neural network to perform a second task associated with the receiver. The first neural network performs a demapping task and the second neural network performs a channel estimation task. The first neural network is configured to process, at least in part, an output of the second neural network as an input of the first neural network.

In an embodiment of the first aspect, the communications apparatus communicates with a second communications apparatus over a channel. The second communications apparatus comprises a transmitter and a second processor configured to implement, at least in part, a second neural network to perform a task associated with the transmitter of the second communications apparatus.

In an embodiment of the first aspect, the transmitter of the second communications apparatus is configured to transmit a sequence of known data to the receiver of the communications apparatus. The first neural network is trained based on a binary cross entropy loss between the known data and predicted log likelihood ratios (LLRs) generated by the first neural network.

In accordance with a second aspect of the disclosure, a communications system is provided. The communications system comprises a first communications apparatus comprising a receiver for communicating over a channel. The first communications apparatus further comprises a processor configured to implement, at least in part, a first neural network to perform a task associated with the receiver. The first neural network is re-trained periodically using a training data set comprising a number of frames of data received by the receiver over the channel. The first neural network comprises a fully fused neural network.

In an embodiment of the second aspect, the first neural network is configured to generate log likelihood ratios (LLRs) of transmitted bits based on equalized symbols of an orthogonal frequency division multiplexing (OFDM) frame received by the receiver over the channel. The OFDM frame consists of N subcarriers and K symbols per subcarrier.

In an embodiment of the second aspect, the first neural network comprises a multi-layer perceptron (MLP) configured to receive the equalized symbols $\hat{X}_{i,j}$ of the OFDM frame, a noise variance estimate $$\sigma_{i,j}^2$$

associated with each resource element of the OFDM frame, and a positional encoding p(i,j) of an index tuple (i,j) associated with each resource element as inputs. The MLP is configured to generate in LLRs for each equalized symbol of the OFDM frame, where $2^m$ is equal to an order of a constellation used in a quadrature amplitude modulation (QAM) modulation and coding scheme (MCS) used to communicate over the channel.

In an embodiment of the second aspect, the first neural network is re-trained periodically based on training data that comprises, for each OFDM frame of a plurality of OFDM frames, a set of tuples, each tuple in the set of tuples consisting of an equalized symbol for a particular resource element of the OFDM frame and corresponding valid bits for the equalized symbol. The corresponding valid bits are generated by encoding information bits using forward error correction (FEC), and the information bits are derived by a channel decoder based on the LLRs and confirmed as valid based on a cyclic redundancy check (CRC) using a last C bits of the information bits.

In an embodiment of the second aspect, the first neural network is re-trained periodically using stochastic gradient descent every $f$ OFDM frames, where $f$ is a positive integer. In an embodiment, the first neural network is re-trained at least once every 10 ms during operation of the receiver to receive a plurality of OFDM frames.

In an embodiment of the second aspect, the first neural network is configured to generate an estimate of a channel matrix based on a received resource grid of a t-th orthogonal frequency division multiplexing (OFDM) frame received by the receiver over the channel. The OFDM frame consists of N subcarriers and K symbols per subcarrier.

In an embodiment of the second aspect, the first neural network is configured to generate an estimate of a three-dimensional tensor that represents information bits based on a received resource grid of a t-th orthogonal frequency division multiplexing (OFDM) frame received by the receiver over the channel. The OFDM frame consists of N subcarriers and K symbols per subcarrier.

In an embodiment of the second aspect, the communications system further comprises a second communications apparatus comprising a transmitter. The second communications apparatus further comprises a second processor configured to implement, at least in part, a second neural network to perform a task associated with the transmitter of the second communications apparatus. The transmitter of the second communications apparatus is configured to transmit a sequence of known data to the receiver of the communications apparatus, and the first neural network is trained based on a binary cross entropy loss between the known data and predicted log likelihood ratios (LLRs) generated by the first neural network.

In accordance with a third aspect of the disclosure, a method is provided for training a transceiver including neural network components. The method includes: acquiring a training data set based on one or more frames received by a receiver of a communications apparatus. The training data comprises sets of tuples comprising equalized symbols for the one or more frame and corresponding valid bit sequences for each of the equalized symbols. The valid bit sequences are encoded via forward error correction applied to information bits that successfully passed a cyclic redundancy check (CRC) based on a last C bits of the information bits. The method further includes re-training, periodically, a first neural network configured to perform a task associated with the receiver using the training data set for a number of frames. The first neural network comprises a fully fused neural network.

In an embodiment of the third aspect, the re-training is performed over a number B of iterations, each iteration corresponding to a batch of index tuples (i,j) drawn either deterministically or randomly from $\mathcal{D}$, where $\mathcal{D}$ is the set of all index tuples (i,j) corresponding to resource elements in the frame that carry valid data.

In accordance with a fourth aspect of the disclosure, a method for end-to-end training of an auto-encoder is provided. The auto-encoder comprises a first neural network corresponding to a transmitter of a first communications apparatus and a second neural network corresponding to a receiver of a second communications apparatus. The method includes: initializing parameters of the first neural network and the second neural network; transmitting, via the transmitter, a sequence of known data to the receiver; generating, via the receiver, a set of equalized symbols in response to the transmitted sequence of known data; training the second neural network based on a binary cross entropy loss between the sequence of known data and predicted log likelihood ratios (LLRs) generated by the second neural network based on the set of equalized symbols; transmitting, via the transmitter, a second sequence of known data, wherein the transmitter is configured to perturb the output of the transmitter in accordance with a perturbation noise; receiving, by the transmitter, a feedback loss signal from the receiver; calculating a second loss signal based on the feedback loss signal and the perturbation noise; and training the first neural network based on the second loss signal. The second neural network comprises a fully fused neural network.

In an embodiment of the fourth aspect, the training of the second neural network and the first neural network are repeated periodically in accordance with a termination criterion.

In an embodiment of the fourth aspect, the second neural network is a fully fused neural network.

BRIEF DESCRIPTION OF THE DRAWINGS

The present systems and methods for implementing transceiver components using fully fused neural networks are described in detail below with reference to the attached drawing figures.

DETAILED DESCRIPTION

The use of fully fused neural networks as a replacement for certain components of a transceiver is proposed herein. The use of fully fused neural networks in such applications may be retrained orders of magnitude faster than traditional approaches that attempt to use more complex neural networks. Retraining the fully fused neural networks using training data sets derived from received data that is determined valid base on a cyclic redundancy check allows for adaptation to changing conditions of the channel in real-time. In contrast, conventional techniques train a neural network offline on a large dataset before deployment, and no additional training is performed after deployment.

Fully fused neural networks may be used as a replacement for, or to augment, traditional transceiver components for physical layer processing. For example, fully fused neural networks may be used to replace or augment signal processing blocks (e.g. channel estimation, soft-symbol demapping, etc.) in transceivers for communication systems.

At least one of a demapping module, an equalization module, or a channel estimation module can be implemented, at least in part, using a fully fused neural network. The neural network can be trained online during operation by acquiring training data sets using a number of received frames of data. Re-training of the neural network is performed periodically to adapt the neural network to changing channel characteristics. In various embodiments, a neural demapper, a neural channel estimator, and a neural receiver are disclosed to replace or augment one or more components of the transceiver. In another embodiment, an auto-encoder can be implemented across a transmitter and receiver to replace most of the components of the transceiver, the auto-encoder being trained via an end-to-end learning algorithm.

Figure 1A:
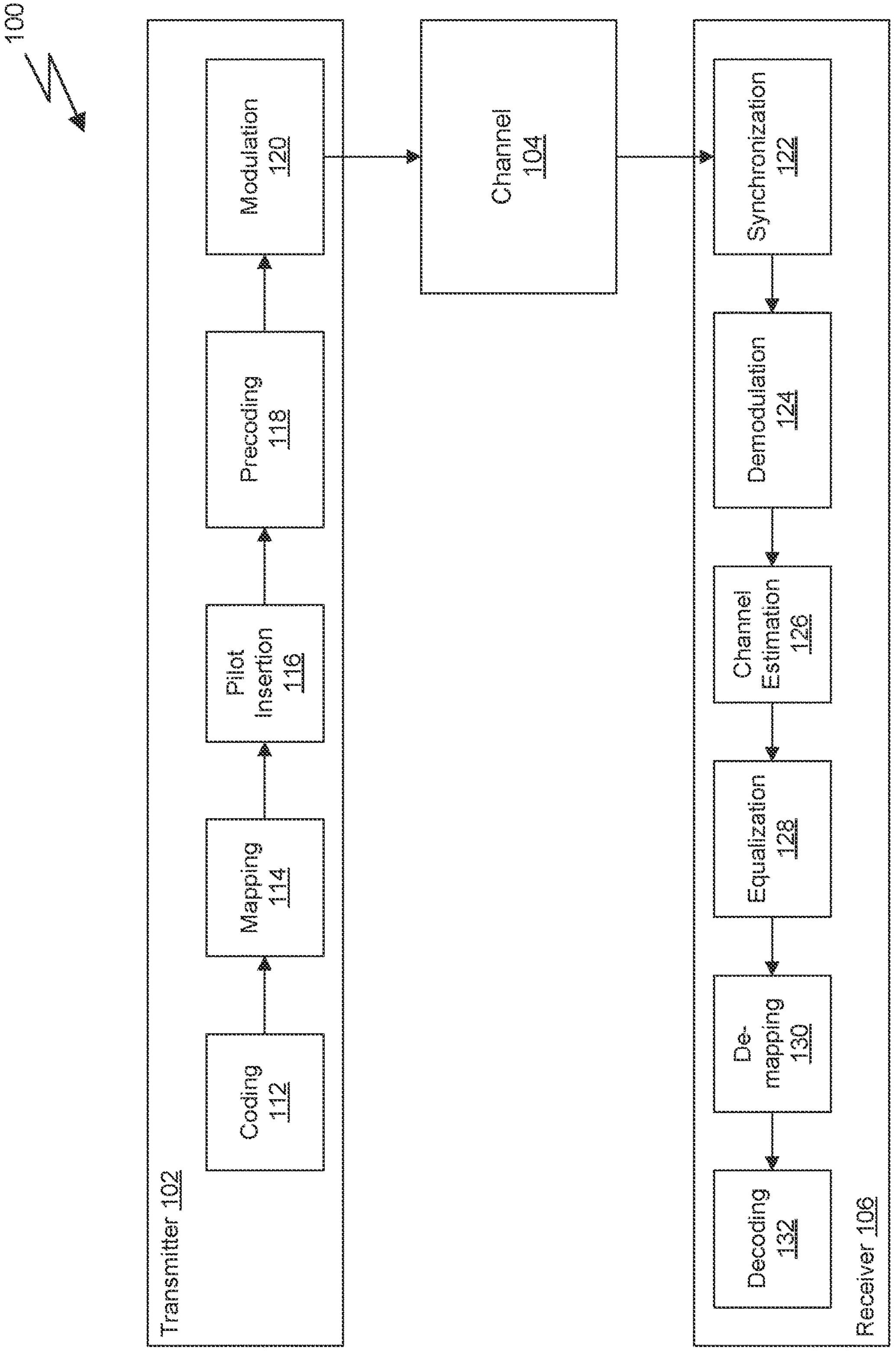
FIG. 1A illustrates a block diagram of a communications system, in accordance with an embodiment.

FIG. 1A illustrates a block diagram of a communications system 100, in accordance with an embodiment. The communications system 100 includes a transmitter 102 and a receiver 106 configured to communicate over a channel 104. In an embodiment, the communications system 100 may be implemented as a cellular communications network such as a long-term evolution (LTE) wireless network (otherwise referred to as a fourth-generation or 4G network), a new radio (NR) wireless network (otherwise referred to as a fifth-generation or 5G network), or the like. Alternatively, the communications system 100 can be a wireless fidelity (Wi-Fi) network in accordance with an IEEE 802.11 standard. In such wireless communications systems, the channel 104 is a medium of communication that has dynamic characteristics based on the objects between the transmitter and the receiver in the real-world environment.

The transmitter 102 includes a coding module 112, a mapping module 114, a pilot insertion module 116, a precoding module 118, and a modulation module 120. These modules may implement, at least in part, a physical layer of a telecommunications stack implemented by a user equipment (UE) that includes the transmitter. The coding module 112 transforms a bit sequence into a coded sequence in accordance with a line code. The mapping module 114 maps coded symbols of a bitstream to various resource elements of a frame. The pilot insertion module 116 inserts pilot signals into a certain subset of the resource elements of the frame. The precoding module 118 processes the signal for multiple antennas to increase signal strength at the receiver 106. The modulation module 120 generates radio frequency (RF) signals transmitted by the antenna(s) of the transmitter 102. The modulation module 120 may utilize, e.g., quadrature amplitude modulation (QAM) to transmit different RF signals on a number of carrier frequencies.

The receiver 106 includes a synchronization module 122, a demodulation module 124, a channel estimation module 126, an equalization module 128, a demapping module 130, and a decoding module 132. These modules may implement, at least in part, a physical layer of a telecommunications stack implemented by a user equipment (UE) that includes the receiver. The synchronization module 122 synchronizes the signals received on different carrier frequencies using different delay values. The demodulation module 124 extracts a signal from a carrier wave for different carrier frequencies. The channel estimation module 126 estimates characteristics of the channel 104 using the pilot signals to adjust the received signal to account for attenuation, phase shift, and/or noise on the different carrier frequencies. The equalization module 128 adjusts signals in the frequency domain based on the channel estimates. The demapping module 130 maps resource elements to a bitstream of coded symbols. The decoding module 132 converts the coded symbols to the original bitstream.

As used herein, a module may refer to a set of functions performed by any combination of hardware or software. For example, the modulation module 120 can be implemented in one device as a hardware chip, application specific integrated circuit (ASIC), field programmable gate array (FPGA), or the like that is configured to modulate carrier signals to generate RF signals transmitted by one or more antennas. In contrast, some modules may be implemented by software executed by a processor, such as a central processing unit (CPU), parallel processing unit (PPU), reduced instruction set computer (RISC), or some other co-processor or microcontroller configured to implement a set of instructions to process signals or data. It will be appreciated that various modules may be implemented in a digital domain and/or an analog domain. There are a large number of variations for how communications hardware designers may choose to implement the various components of a transmitter or receiver described generally above.

Figure 1B:
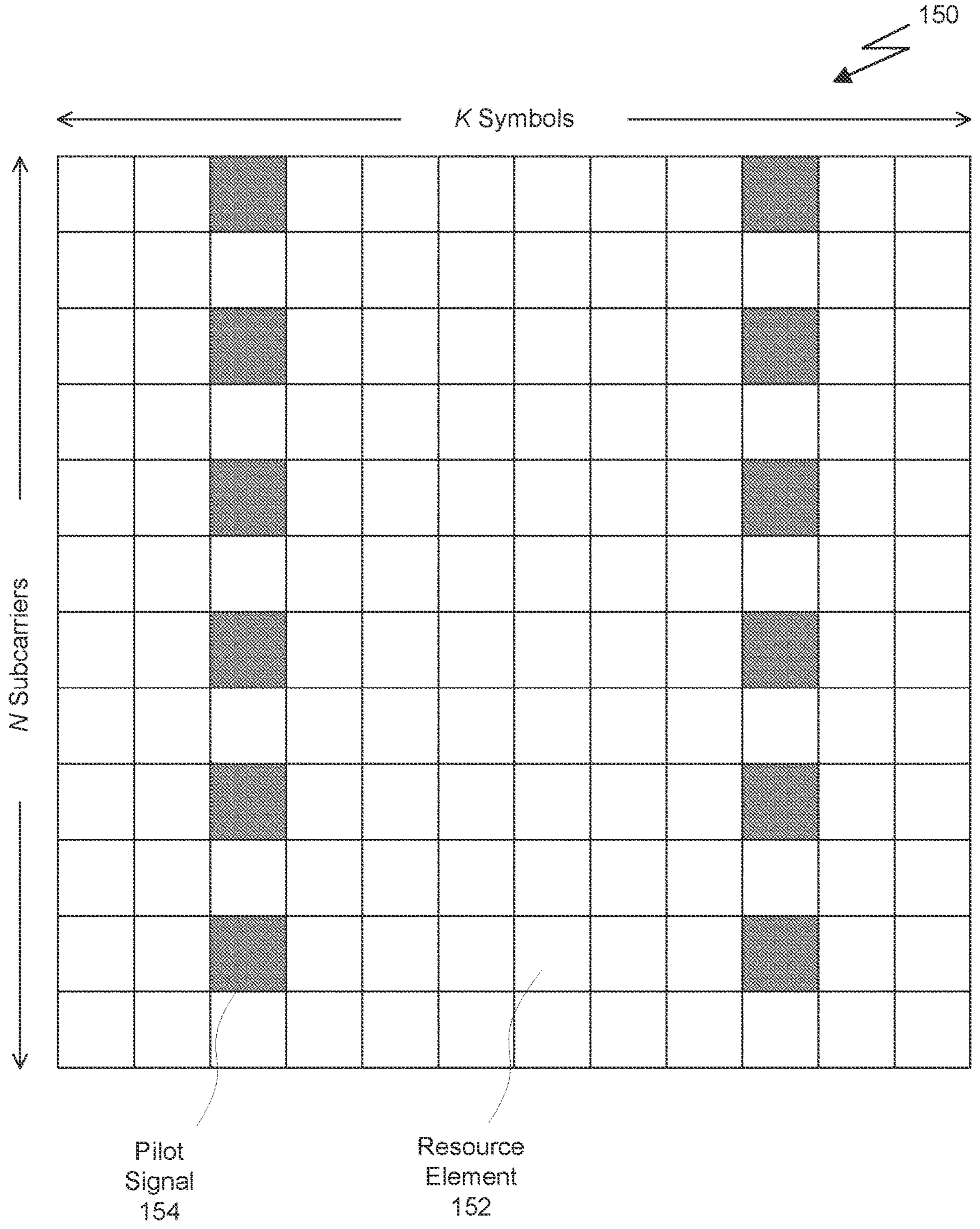
FIG. 1B illustrates an orthogonal frequency division multiplexing (OFDM) frame, in accordance with an embodiment.

FIG. 1B illustrates an orthogonal frequency division multiplexing (OFDM) frame 150, in accordance with an embodiment. The OFDM frame 150 comprises K symbols transmitted on each of a number N of subcarriers over a period of time. A subcarrier refers to a particular center frequency of a RF signal, where the bandwidth of the OFDM frame is distributed over a number of subcarriers separated in frequency in accordance with a subcarrier spacing. The OFDM frame may be described as containing a plurality of time-frequency resources, and each time-frequency resource may be referred to herein as a resource element (RE) 152. A RE 152 comprises a symbol, which represents a number of bits. A subset of the REs 152 of the OFDM frame 150 contain pilot signals 154, which are shown as the shaded squares in the grid of FIG. 1B.

In contrast with a traditional approach for implementing the components of the physical layer of a communications device, one or more of the modules described above may be replaced with or augmented by a neural network. For example, in various embodiments described herein, one or more of the demapping module 130, channel estimation module 126, and/or decoding module 132 may be replaced with a neural network that predicts the outputs of such modules based on one or more inputs. Each module may be replaced or augmented by a separate and distinct neural network or, alternatively, multiple modules may be replaced or augmented by a single neural network. In some embodiments, most components of both the transmitter and receiver in two communication apparatuses may be replaced with a pair of neural networks that are then jointly trained.

The use of neural networks provides improvements when compared to traditional PHY layer implementations of a transceiver when the channel characteristics are stable. In other words, the neural networks may be initially trained using a large data set or simulated channel response, and then the system may be deployed without the need for retraining. However, in practice, the channel characteristics are rarely stable unless the communications devices are stationary and the environment proximate to the devices does not change. In most cases, periodic re-training or online training is desired to improve the quality of the devices and reduce the bit error rate of transmissions. One benefit when using online training is that the neural networks can be smaller as it is not necessary for the neural network to be trained to generalize across a wide set of channel responses. In addition, online training may also compensate for hardware impairments such as non-linearity in the RF chain. However, online training is ruled by a very tight delay constraint (i.e., low latency) and small training data sets that use as little computational resources as possible.

The neural networks may be fully fused such that the networks may be run during inferencing and/or trained at an extremely fast rate. This enables the neural networks, when online and operational, to quickly adapt to changing channel characteristics as the UE or other device moves around within the real-world environment. As used herein, a fully fused neural network refers to a neural network implemented in a single kernel on a parallel processor. The kernel can comprise a number of threads or thread blocks (e.g., 32 threads), each thread executing a number of operations on different subsets (e.g., batches) of the input data. In some cases, instructions in each thread can be executed on tensor cores configured to perform matrix multiplication operations efficiently. Performance of a fully fused neural network is improved by minimizing access to global memory (e.g., off-chip video random access memory (VRAM), high-level L2 caches, etc.) and fully utilizing faster on-chip memory (e.g., L1 caches, shared memory/register file, etc.). In other words, the kernel is designed so that the only slow memory accesses are reading the inputs to the neural network from global memory and writing the output from the neural network to global memory. All intermediate values are operated on in fast on-chip memory such as registers or other shared memory and low level caches.

In an embodiment, a fully fused neural network is implemented by dividing the input vectors into batches having a width of a particular size (e.g., 128 elements wide), where each batch is processed by a corresponding thread block. Each thread in the thread block then computes a number of rows (e.g., a subset of rows) of the output for a particular layer of the neural network by loading a subset of weights from global memory into registers and computing portions of the output for the batch over all columns of the input in one or more passes. In some embodiments, the rows of weights and sections of elements can be diced into, e.g., 16×16 element chunks to be processed in a tensor core. For additional rows of the output, new weights can be loaded into the registers and then additional portions of the output are computed for the batch. The intermediate results after processing each layer remains in fast on-chip shared memory as it is processed through multiple layers of the fully fused neural network, alternating between weight-element multiplication operations and element-wise application of an activation function. Once all layers of the neural network have been processed, then the output can be written from the shared memory back to global memory.

Examples of fully fused neural networks are described in U.S. patent application Ser. No. 17/340,283, titled "Fully Fused Neural Network Execution", filed on Jun. 7, 2021, and U.S. patent application Ser. No. 17/672,566, titled "Multiresolution Hash Encoding for Neural Networks, filed on Feb. 15, 2022, each of which is herein incorporated by reference in their entireties.

Figure 2A:
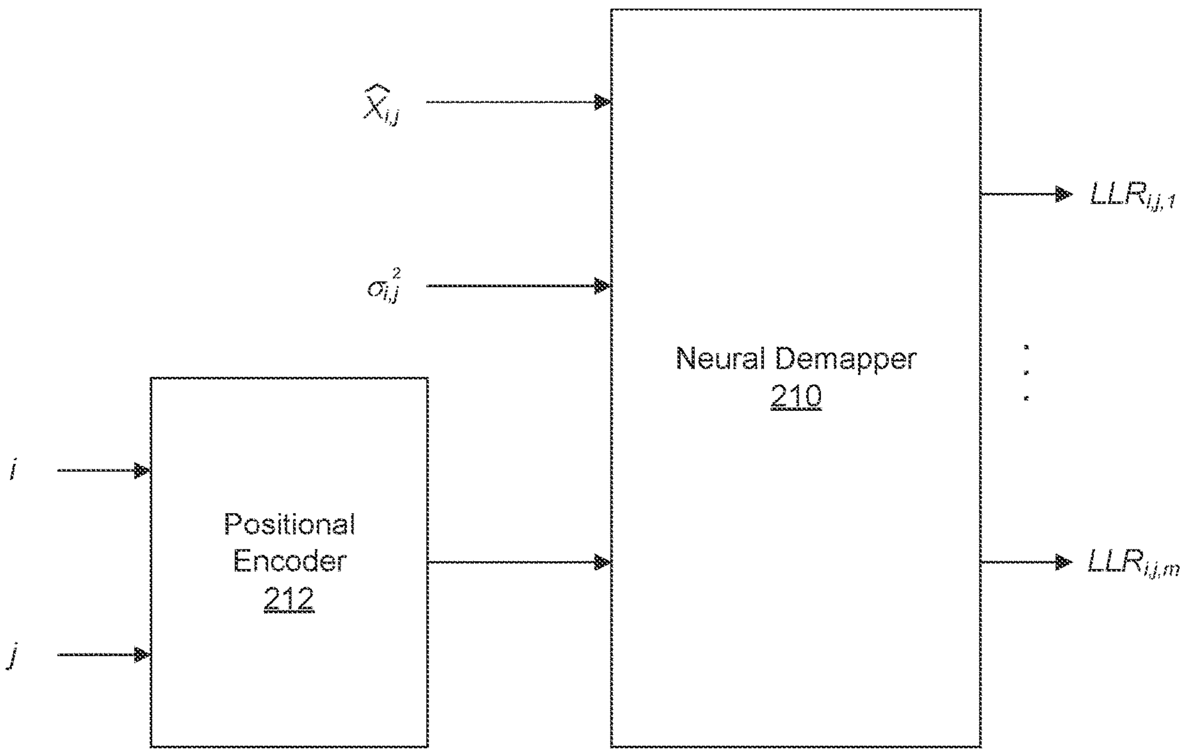
FIG. 2A illustrates a neural demapper implemented for a transceiver of a communications apparatus, in accordance with an embodiment.

FIG. 2A illustrates a neural component of a transceiver of a communications apparatus, in accordance with an embodiment. The neural demapper 210 may be used to replace or augment the traditional demapping module, and the neural demapper 210 transforms equalized symbols into predictions of log likelihood ratios (LLRs) of the transmitted bits for each of the equalized symbols of a frame. After synchronization, cyclic prefix removal, and OFDM demodulation (e.g., using a fast Fourier transform operation), the received resource grid $Y \in \mathbb{C}^{N \times K}$ written as:

$$Y = H \circ X + N, \tag{Eq. 1}$$

where $H \in \mathbb{C}^{N \times K}$ is the channel matrix, $X \in \mathbb{C}^{N \times K}$ is the transmitted resource grid, $N \in \mathbb{C}^{N \times K}$ is additive white Gaussian noise (AWGN) with independent and identically distributed (i.i.d.) elements $N_{i,j} \sim \mathcal{CN}(0, N_0)$, and $\circ$ is an operator for element-wise multiplication. In some embodiments, N represents not only AWGN but other types of interference as well, such as but not limited to interfering transmissions, self-interference due to imperfect synchronization, and quantization. It is also appreciated that the receiver only has access to an estimate of H, represented as $\hat{H}$, which is used to equalize the received resource grid. There are many well-known ways to implement an equalizer, and the neural demapper 210 is unaware of the specific implementation details of the equalizer. The desired result is that the particular equalizer chosen generates an equalized resource grid $\hat{X} \in \mathbb{C}^{N \times K}$, given as:

$$\hat{X} = X + Z, \tag{Eq. 2}$$

where $Z \in \mathbb{C}^{N \times K}$ represents residual noise and self-interference, and $$\mathbb{E}\left[|Z_{i,j}|^2\right] = \sigma_{i,j}^2$$

for all indices $(i,j) \in \mathcal{D}$, where $\mathcal{D}$ is the set of all indices for all resource elements. It will be appreciated that each index refers to a specific resource element in the OFDM frame.

The neural demapper 210 computes, for each tuple of indices (i,j) in $\mathcal{D}$ whose corresponding resource element carries data (i.e., not a pilot signal), LLRs for the corresponding bits $b_{i,j,m}$, where m=1, . . . , M, and where $2^M$ is the order of a QAM constellation used to modulate the RF signals (e.g., M equals 4 for QAM-16).

In a conventional and widely used demapping module, referred to as a Gaussian demapper (e.g., a posterior probability (APP) demapper derived for AWGN), the Gaussian demapper assumes that $$Z_{i,j} \sim \mathcal{CN}(0, \sigma_{i,j}^2)$$

so that:

$$LLR_{i,j,m} = \log\left(\frac{Pr(b_{i,j,m}=1)}{Pr(b_{i,j,m}=0)}\right) = \log\left(\frac{\sum_{c \in \mathcal{C}_{m,1}} \exp\left(-\frac{1}{\sigma_{i,j}^2}\left|\hat{X}_{i,j} - c\right|^2\right)}{\sum_{c \in \mathcal{C}_{m,0}} \exp\left(-\frac{1}{\sigma_{i,j}^2}\left|\hat{X}_{i,j} - c\right|^2\right)}\right), \tag{Eq. 3}$$

where $\mathcal{C}_{m,0}$ and $\mathcal{C}_{m,1}$ are the sets of constellation symbols for which the m-th bit is equal to 0 and 1, respectively. The LLRs are then fed into a decoder to recover the transmitted bits. As seen in Equation 3, the equalized symbols $\hat{X}_{i,j}$ and the corresponding estimated variance $$\sigma_{i,j}^2$$

for each equalized symbol are provided to the Gaussian demapper, which calculates the corresponding LLRs according to the given formula.

It is very difficult in practice to determine good estimates of the variance $$\sigma_{i,j}^2,$$

and the distribution of the elements of Z may differ substantially from the Gaussian distribution assumed in Equation 3 above. Thus, there may be a substantial mismatch between the true APP LLRs and the LLRs calculated according to Equation 3. The mismatch generally results in a degradation of the coded bit error rate (BER). In contrast, the neural demapper 210 learns the mapping from the equalized symbols to the LLRs, and periodic retraining of the fully fused neural network implemented therein will compensate for the mismatch to improve performance compared to the traditional Gaussian demapper.

In an embodiment, the neural demapper 210 implements a first neural network configured to predict LLRs based on the equalized symbols. In an embodiment, the first neural network comprises a multi-layer perceptron (MLP) configured to receive the equalized symbols $\hat{X}_{i,j}$ of the OFDM frame, a noise variance estimate $$\sigma_{i,j}^2$$

associated with each resource element of the OFDM frame, and a positional encoding p(i,j) of an index tuple (i,j) associated with each resource element as inputs and generate n LLRs for each equalized symbol of the OFDM frame, where $2^m$ is equal to an order of a constellation used in a quadrature amplitude modulation (QAM) modulation and coding scheme (MCS) used to communicate over a channel. The first neural network implements the function $f_\theta:(\mathbb{C}, \mathbb{R}_+) \mapsto \mathbb{R}^M$. As shown in FIG. 2A, a positional encoder 212 receives the index tuple (i,j) and generates an encoding $p(i,j) \in \mathbb{R}^P$ for the index tuple that is passed to the neural demapper 210 along with the equalized symbols $\hat{X}$i,j and the corresponding noise variance estimates $$\sigma_{i,j}^2,$$

leading to:

$$f_\theta: \left(\mathbb{C}, \mathbb{R}_+, \mathbb{R}^P\right) \mapsto \mathbb{R}^M \tag{Eq. 4}$$

$$\left(\hat{X}_{i,j}, \sigma_{i,j}^2, p(i,j)\right) \mapsto LLR_{i,j} \tag{Eq. 5}$$

In an embodiment, the positional encoder 212 generates a frequency-type encoding for the index tuple (i,j) of the form:

$$p(i,j)=\left[\sin(\omega_1 i), \cos(\omega_1 i), \dots, \sin\left(\omega_{\frac{P}{4}} i\right), \cos\left(\omega_{\frac{P}{4}} i\right), \sin(\omega_1 j), \cos(\omega_1 j), \dots, \sin\left(\omega_{\frac{P}{4}} j\right), \cos\left(\omega_{\frac{P}{4}} j\right)\right]^T, \quad \text{(Eq. 6)}$$

where:

$$\omega_k=\left(Z^{\frac{4k}{P}}\right)^{-1}, k=1, \dots, \frac{P}{4}, \quad \text{(Eq. 7)}$$

and Z is an arbitrary positive real number. In other embodiments, the positional encoder 212 may use other encoding algorithms such as parametric encodings, normalizing the grid positions to an interval [0,1], or any other type of at least one of an encoding and embedding technique.

Figure 2B:
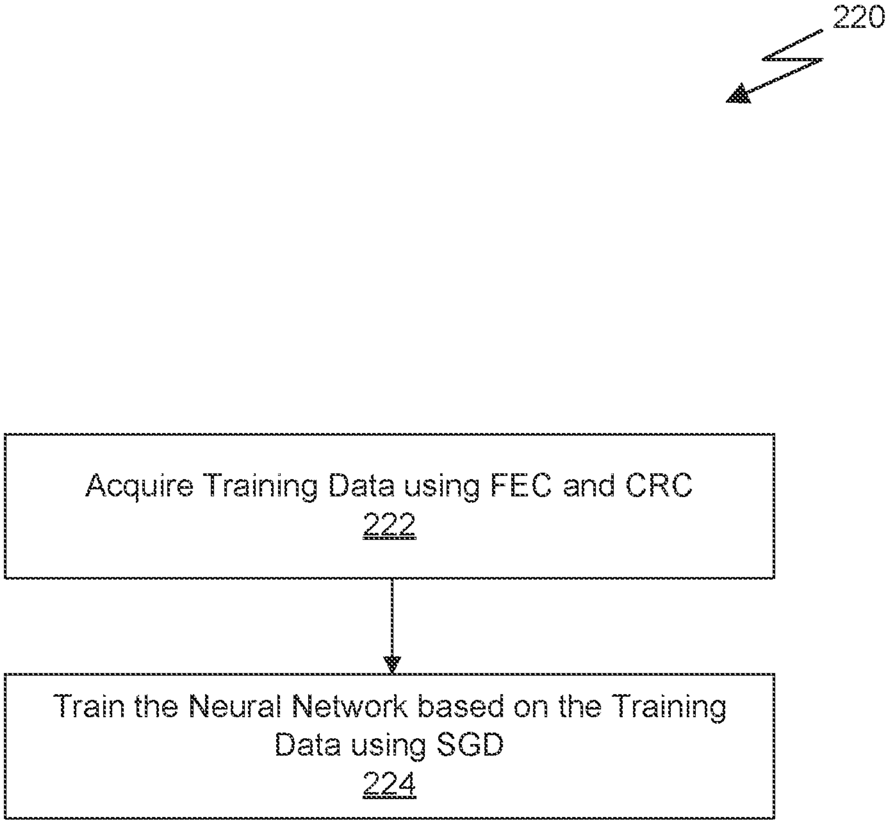
FIG. 2B is a flowchart of a method for retraining the neural component of the transceiver, in accordance with an embodiment.

As discussed above, the neural demapper 210 benefits from online re-training. Constantly adjusting the neural network can help to improve the BER even if the channel estimation task (as performed by a channel estimation module) is not entirely accurate. The method 220 for retraining the neural demapper 210 is performed in two steps, as shown in FIG. 2B.

At 222, training data is acquired using forward error correction (FEC) and cyclic redundancy check (CRC). Let $\hat{X}(t)$ represent the grid of equalized symbols for the t-th frame and $$\sigma_{i,j}^2(t)$$

represent the corresponding noise variance estimates, and $\mathcal{D}$ denoting the set of all index tuples (i,j) for which a corresponding resource element carries data. The neural demapper 210 is executed to generate predictions for the LLRs for each symbol in $\hat{X}(t)$, as follows:

$$LLR_{i,j}(t)=f_{\ddot{\theta}(t)}\left(\hat{X}_{i,j}(t), \sigma_{i,j}^2(t), p(i,j)\right), (i,j)\in\mathcal{D} \quad \text{(Eq. 8))}$$

where $\ddot{\theta}(t)$ is an exponential moving average (EMA) computed as follows:

$$\ddot{\theta}(t)=\frac{1-\alpha}{\eta(t)}\theta(t)+\alpha\eta(t-1)\ddot{\theta}(t-1), \quad \text{(Eq. 9)}$$

where $\eta(t)=1-\alpha^t$ and $\alpha\in[0,1]$ is a hyper-parameter. A typical value of $\alpha$ may be 0.99 to achieve a good trade-off between fast adaptation and temporal stability.

Next, the values of $LLR_{i,j}(t)$ for all index tuples (i,j) in $\mathcal{D}$ are stacked into a vector and provided to the decoding module to decode the information bits $u(t)\in\{0,1\}^{|\mathcal{D}|\cdot M\cdot r}$, where $|\mathcal{D}|$ is the cardinality of D (i.e., the number of data symbols), M is the number of bits per symbol, and $r\in(0, 1]$ is the code rate. In an embodiment, the decoding module may implement a low-density parity check (LDPC) or Polar decoding algorithm to obtain the vector of transmitted information bits.

Once the information bits have been decoded, a CRC is performed to check the validity of the information bits. It is assumed that the last C bits of u(t) are used as the check bits. If the CRC is valid, the transmission of the frame is determined to be successful, and the result of the transmission can be used for online training.

To populate the training data set Q, the information bits u(t) are re-encoded using FEC to obtain the vector $b(t)\in\{0,1\}^{|\mathcal{D}|\cdot M\cdot r}$, which is then divided into blocks of M bits $b_{i,j}(t)\in\{0,1\}^M$, which corresponds to the bits mapped onto each symbol of the (i,j)-th resource element. The set of tuples $Q(t)=\{(\hat{X}_{i,j}(t), b_{i,j}(t)): \forall(i,j)\in\mathcal{D}\}$ is then stored for training.

At 224, the neural network is trained using the training dataset based on stochastic gradient descent. In an embodiment, the training is done iteratively on small batches of tuples, each batch corresponding to a subset of $\mathcal{D}$. More specifically, for b=1, . . . , B, training is performed in accordance with the following:

$$\theta'(t+1)=\theta(t+1)-\gamma\nabla_{\theta(t+1)}\frac{1}{|\mathcal{D}_b|}\sum_{d\in\mathcal{D}_b}\ell_d(t), \quad \text{(Eq. 9)}$$

where $\mathcal{D}_b\subseteq\mathcal{D}$ refers to B mini-batches of index tuples (i,j) drawn either deterministically or randomly from $\mathcal{D}$, $\nabla_{\theta(t+1)}$ is the Nambla-operator representing the gradient of the averaged loss terms $\ell_d(t)$, and $\gamma>0$ is a hyper-parameter that represents the learning rate. In an embodiment, the loss term $\ell_d(t)$ is a binary cross-entropy loss computed as:

$$\ell_d(t)=-\frac{1}{M}\left[\log(\overline{f}^d_{\theta(t+1)})^T b_d(t)+\log\left(1-\overline{f}^d_{\theta(t+1)}\right)^T(1-b_d(t))\right], \quad \text{(Eq. 10)}$$

where $$d=(i,j)\in\mathcal{D}, \text{ and } \overline{f}^d_{\theta(t+1)}$$

denotes the neural network's output after applying a sigmoid activation function given as:

$$\overline{f}^d_{\theta(t+1)}=\text{sigmoid}\left(f_{\theta(t+1)}\left(\hat{X}_{i,j}(t), \sigma_{i,j}^2(t), p(i,j)\right)\right) \quad \text{(Eq. 11)}$$

In an embodiment, the initial weights $\theta(0)$ may be selected randomly or in a deterministic way according to a selected distribution or may be obtained through meta-optimization. Meta-optimization is described in more detail in Finn et al., "Model-agnostic meta-learning for fast adaptation of deep networks," Int'l Conf. on Machine Learning, vol. 70, 1126-1135 (2017), which is incorporated by reference in its entirety.

In some embodiments, the training data may comprise valid tuples from multiple frames (e.g., a previous r frames). In other words, the training set $\overline{Q}(t)=\{Q(t), Q(t-1), \dots, Q(t-r+1)\}$. It may be preferable to run a re-training task every r frames, and use valid tuples collected over the last r frames as the training data set. It will be appreciated that the batch size and the number of batches can remain the same regardless of how many frames are included in the training data set. In other words, even if the number of tuples included in the training data set is large, only a small subset of the available training data can be used to re-train the neural network during a given re-training task.

It will be appreciated that the method disclosed above can be generalized to the case of multiple-input, multiple-output (MIMO), in which case the equalized symbols $\hat{X}(t)$ correspond to a single received stream.

In some embodiments, it is possible that the codeword (e.g., the bit vector passed to the decoding module) is spread or interleaved over multiple frames rather than being included in a single frame. However, it is straightforward to adapt the above method to retrieve the codeword from multiple frames prior to decoding the codeword and checking via CRC, for example.

Conceptually, the method described above may also be implemented using a single carrier frequency transmission. However, in such cases, additional pilot signals may need to be sent at the beginning of a transmission in order to train the system using the pilot signals before data is transmitted.

In an embodiment, by way of illustration, the communications system may be configured to transmit data on a carrier frequency of 3.5 GHz with N=128 subcarriers with subcarrier spacing of 30 kHz. The OFDM frame consists of K=14 OFDM symbols with a cyclic prefix length of eight. Each frame carries 1792 QAM16 symbols, which corresponds to a single codeword of information bit length equal to 7168 bits with a code rate of r=0.5. A standard-compliant 5G LDPC code is used for coding/decoding.

In one embodiment, the neural demapper 210 may be trained with positional encodings using parameters P=8 and $Z=10^4$. The neural network may be a MLP with one hidden layer with 32 neurons, followed by a rectified linear unit (ReLU) activation layer and four output neurons (corresponding to M=4), without activations. The neural demapper 210 may be continuously trained on datasets comprising a selected number of last frames.

The previous description shows the benefits of using a fully fused neural network as a replacement for a conventional demapper that arise based on compensation of dynamic channel characteristics. However, other benefits can be gained using the same framework. For example, for high-carrier frequencies such as in the THz communication, the residual receiver phase noise may cause a severe degradation of the achievable communications performance. As a result, the previously described conventional Gaussian demapper is known to be suboptimal in such situations. In such a scenario, the fully fused neural demapper may implicitly learn the demapping task to continuously track changes to noise distribution.

As another example, the demand for low-budget consumer hardware urges a need for robust—and adaptive—signal processing components that may compensate for hardware impairments. Such impairments may be caused by higher manufacturing tolerances in cheaper devices, hardware alteration, temperature drifts, and so forth. One example is IQ-imbalance, which leads to non-orthogonality in the in-phase and quadrature signal components. Other examples are amplifier non-linearity and/or carrier-frequency offsets. However, the fully fused neural demapper may learn to compensate for these impairments, which may also change over time.

In yet another example, channels may exhibit non-AWGN behavior (e.g., colored noise due to low or bandpass behavior of the channel). The fully fused neural demapper may learn to continuously adapt to the current noise characteristics rather than relying on an assumption of AWGN.

Figure 2C:
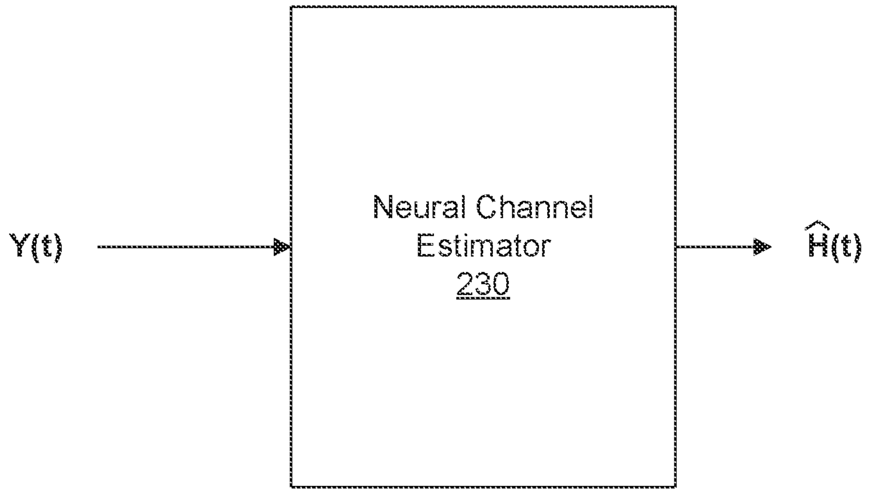
FIG. 2C illustrates a neural channel estimator 230, in accordance with an embodiment.

FIG. 2C illustrates a neural channel estimator 230, in accordance with an embodiment. As discussed above, the channel estimation module may also be replaced and/or augmented by a neural network configured to predict the channel characteristics. The neural channel estimator 230 may be used with a conventional demapper, such as the Gaussian demapper, or in conjunction with the neural demapper 210. In other words, a first neural network may be trained to perform the decoding task and a second neural network may be trained to perform the channel estimation task.

As shown in FIG. 2C, the neural network implemented by the neural channel estimator 230 should be continuously (e.g., periodically) retrained to learn changing second-order characteristics of the channel (such as the updated covariance matrix). In contrast to the neural demapper 210, there is a problem with the neural channel estimator 230 that a ground-truth for the channel estimates is not available and, therefore, the neural network is trained based on an estimate of ground-truth channel estimates. However, by using channel estimates that result in valid codewords (based on CRC), the training data set will produce adequate results that are typically better than traditional channel estimation algorithms.

In an embodiment, the neural channel estimator 230 receives a received resource grid Y(t) of the t-th frame. Let $b_{i,j}(t)\forall(i,j)\in\mathcal{D}$ represent e transmitted bits obtained by processing the frame and whose validity has been verified using FEC and CRC, as described above. These bits are first mapped to the corresponding transmitted symbols $X_{i,j}(t)$ that were used according to a constellation and bit labeling (e.g., QAM with Gray-labeling). These symbols are then used with resource elements carrying pilot signals to make an estimate of the channel matrix H(t), which is denoted by $\hat{H}(t)$. The residual noise variance estimates $$\sigma^2_{i,j}(t),$$

which can be derived from the channel matrix $\hat{H}(t)$ and an initial estimate of the noise variance $\hat{\mathcal{N}}_0$ of $\mathcal{N}$, may be processed as an input to the demapping module (e.g., the neural demapper 210). The tuple $Q(t)=\{(Y(t), \hat{H}(t))\}$ is then used as the training data set for the neural channel estimator 230. As described previously, the training data set can include data for multiple frames (e.g., the r previous frames). The training data set is then used for online re-training of the fully fused neural network.

Figure 2D:
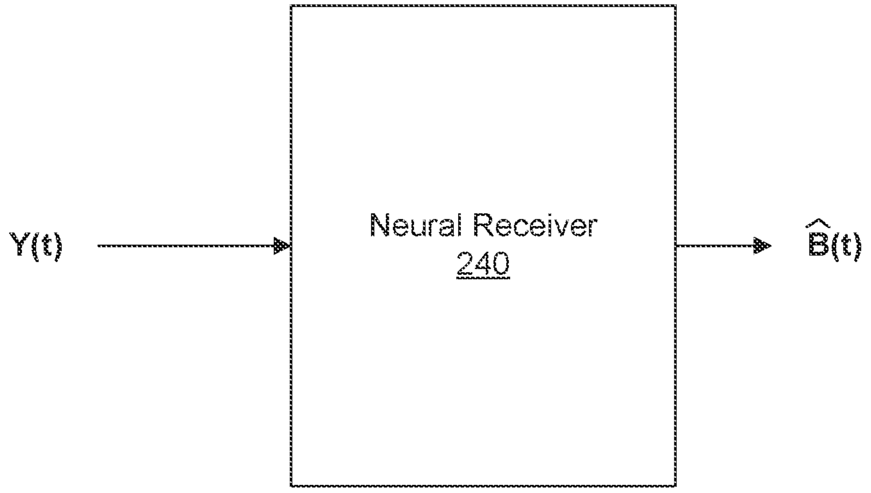
FIG. 2D illustrates a neural receiver 240, in accordance with an embodiment.

FIG. 2D illustrates a neural receiver 240, in accordance with an embodiment. As discussed above, the tasks of channel estimation, equalization, and demapping may also be carried out jointly by a single neural network. The neural receiver 240 is a fully fused neural network that directly estimates the bit sequence based on the received resource grid of a frame.

In an embodiment, the neural receiver 240 receives a received resource grid Y(t) of the t-th frame. The neural receiver 240 is configured to predict a three-dimensional tensor B(t) that includes the information bits $b_{i,j}(t)$. Let $b_{i,j}(t)\forall(i,j)\in\mathcal{D}$ represent the transmitted bits obtained by processing the frame and whose validity has been verified using FEC and CRC, as described above. The tuple $Q(t)=\{(Y(t), B(t))\}$ is then used as the training data set for the neural receiver 240. As described previously, the training data set can include data for multiple frames (e.g., the r previous frames). The training data set is then used for online re-training of the fully fused neural network.

Figure 3A:
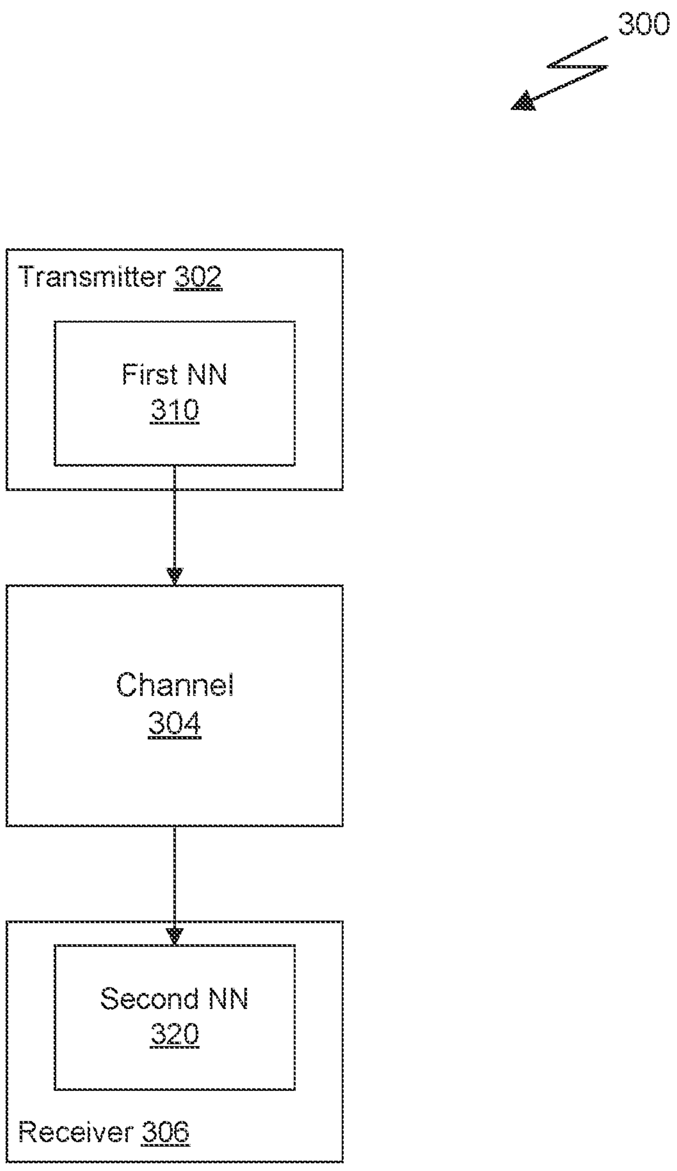
FIG. 3A illustrates end-to-end learning between a pair of fully fused neural networks operating across a channel via the transmitter and receiver, respectively, in accordance with an embodiment.

FIG. 3A illustrates end-to-end learning between a pair of fully fused neural networks operating across a channel via the transmitter and receiver, respectively, in accordance with an embodiment. The principle of end-to-end learning is to replace the traditional transmitter and receiver with a pair of fully fused neural networks, which are then jointly trained to communicate over the actual channel. In the past, these so-called auto-encoders have been trained offline using data from a static channel or a pre-defined ensemble of possible channel realizations. However, the speed on online training of a fully fused neural network enables a new field of applications, where RF waveforms adapt to new environments within or below milliseconds (e.g., within the coherence time of the channel).

As shown in FIG. 3A, a transmitter 302 that includes a first neural network 310 communicates with a receiver 306 that includes a second neural network 320 over a channel 304. The first neural network 310 has trainable parameters $\theta_{tx}$ and the second neural network 320 has trainable parameters $\theta_{rx}$. Hence, the first neural network 310 implements the function $$f_{\theta_{tx}}: F_2^M \mapsto \mathbb{C},$$

where M denotes a number of bits b mapped onto a symbol x and $F_2$ denotes a binary field. Let $f_{ch}(x)$ denote the channel, which is typically a stochastic mapping that depends on the radio environment, speed of the receiver relative to the transmitter, and so forth.

The second neural network 320 implements the function $f_{\theta_{rx}}: \mathbb{C} \mapsto \mathbb{R}^M$, such that:

$$LLR = f_{\theta_{rx}}(f_{ch}(\theta_{\theta_{tx}}(b))). \quad \text{(Eq. 12)}$$

where b denotes the vector of the M transmitted information bits and LLR the corresponding LLR estimates at the receiver. The task of training is to minimize the binary cross-entropy between b and LLR.

At least one of the first neural network 310 or the second neural network 320 may be a fully fused neural network. Both components, jointly trained, allow the system 300 to learn bespoke transceiver components or waveforms that may adapt to the actual channel on-the-fly. The feedback latency (i.e., required signal propagation including computational latency) as well as a training latency become the new limiting factors. In particular, if transmitter/receiver distance is large, then speed of light could effectively limit the update rates. For this reason, the use of fully fused neural networks that enable very fast online training may be important for end-to-end learning applications.

Figure 3B:
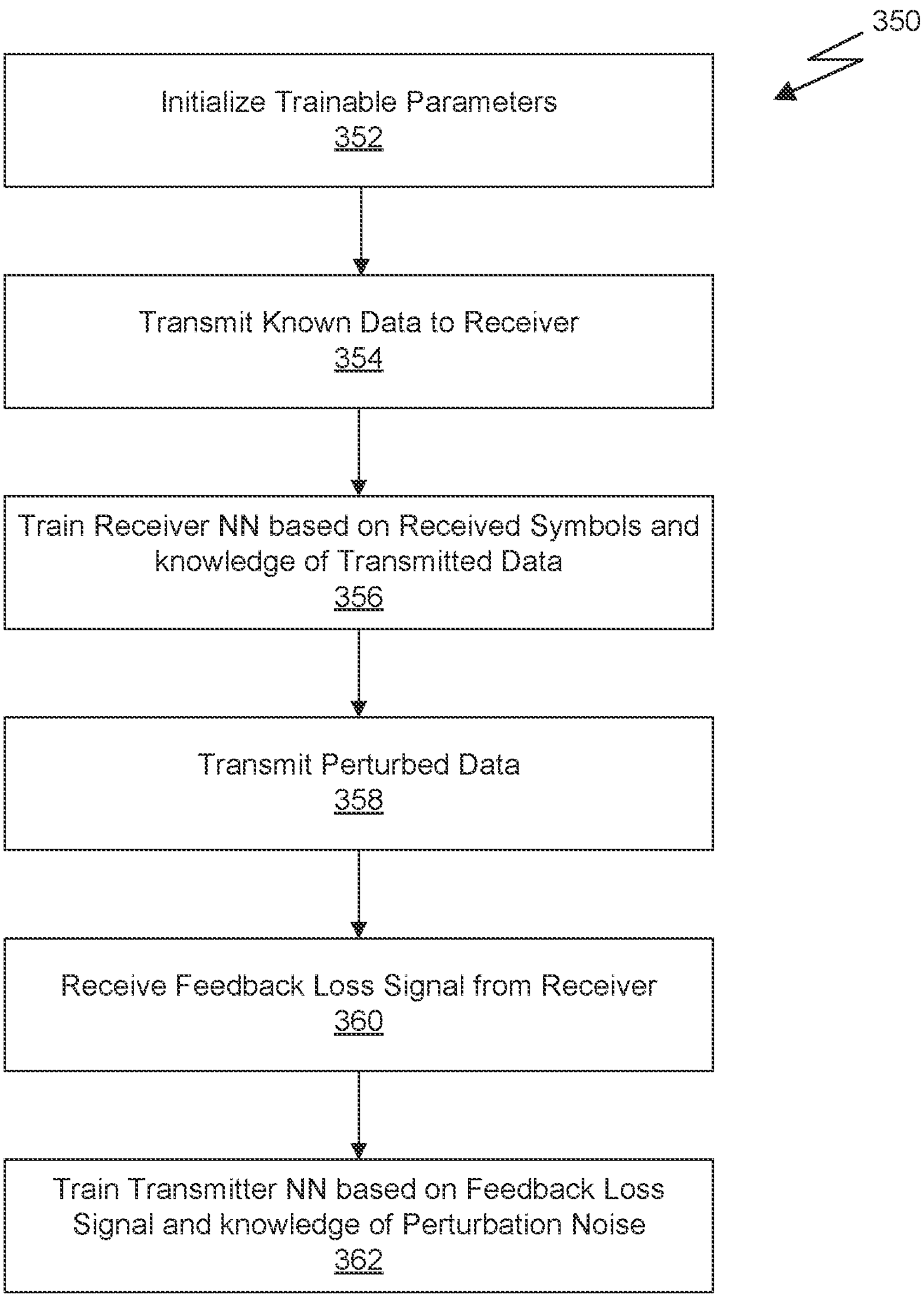
FIG. 3B is a flowchart of a method 350 for end-to-end learning between a transmitter and receiver, in accordance with an embodiment.

The channel itself is a non-differentiable component. Therefore, the transmitter 302 requires a carefully adjusted training procedure. FIG. 3B is a flowchart of a method 350 for end-to-end learning between a transmitter and receiver, in accordance with an embodiment.

At 352, the trainable parameters $\theta_{tx}$ and $\theta_{rx}$ are initialized. At 354, a sequence of known data is transmitted from the transmitter 302 to the receiver 306. At 356, the second neural network 320 is trained based on the received symbols, using the sequence of known data as ground-truth output for the second neural network. Steps 354 and 356 can be repeated over a number of iterations using the same or different sets of known data. Training of the second neural network 320 is complete if performance does not improve or once a maximum number of iterations is reached.

At 358, the transmitter 302 adds a small perturbation noise to the transmitter output. In other words, the output x is given as:

$$x = f_{\theta_{tx}} + \varepsilon, \quad \text{(Eq. 13)}$$

where $$\varepsilon \sim \mathcal{N}(0, \sigma_{exp}^2)$$

denotes exploration noise with variance $$\sigma_{exp}^2,$$

which is an additional training hyper-parameter. At 360, the transmitter 302 receives a feedback loss signal from the receiver 306, which may be the BCE. It is important to note that the apparatus of the transmitter 302 and the apparatus of the receiver 306 must both include a transceiver (i.e., both a transmitter and receiver) in order to enable two-way communication in this embodiment. At 362, the transmitter 302 uses the feedback loss signal along with knowledge of the perturbation noise to compute a new loss function that is used for stochastic gradient descent-based training of the first neural network 310. Training of the first neural network 310 is complete if performance does not improve or once a maximum number of iterations is reached.

In an embodiment, steps 354-362 may be repeated continuously until a selected termination criterion is met.

In yet another embodiment, a fully fused neural network may be implemented by the communications system to predict whether channel decoding is likely to be a failure or a success based on a given LLR realization produced by a demapper. Such embodiments may trigger re-transmission of a frame even before the decoder has determined a decoding failure of the current frame. This may help to reduce the average decoding latency over a number of frames as re-transmission can be started before decoding is complete on frames that are predicted to fail based on the generated LLRs.

The proposed techniques for fast re-training of neural transceiver components is not limited to the aforementioned use cases. Other applications in digital communications where fully fused neural networks may be used are in digital pre-distortion applications and/or full-duplex interference calculations.

As described above, the methods and techniques may be implemented using any combination of hardware and software, including the use of one or more processors to implement, at least in part, the fully fused neural networks. In an embodiment, a fully fused neural network may be implemented via a host processor and/or a parallel processing unit configured to execute a number of instructions to perform the various operations to implement the function of the neural network. For example, the neural demapper 210 can be implemented, at least in part, by executing a series of instructions using the PPU 400, described in more detail below. This can include dividing layers of the neural network into portions that are assigned to different threads and/or cooperative thread arrays. The threads or cooperative thread arrays may include instructions that are executed using tensor cores, or specialized matrix multiplication units, in order to speed up execution of the instructions that implement the function of the neural network.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 4:
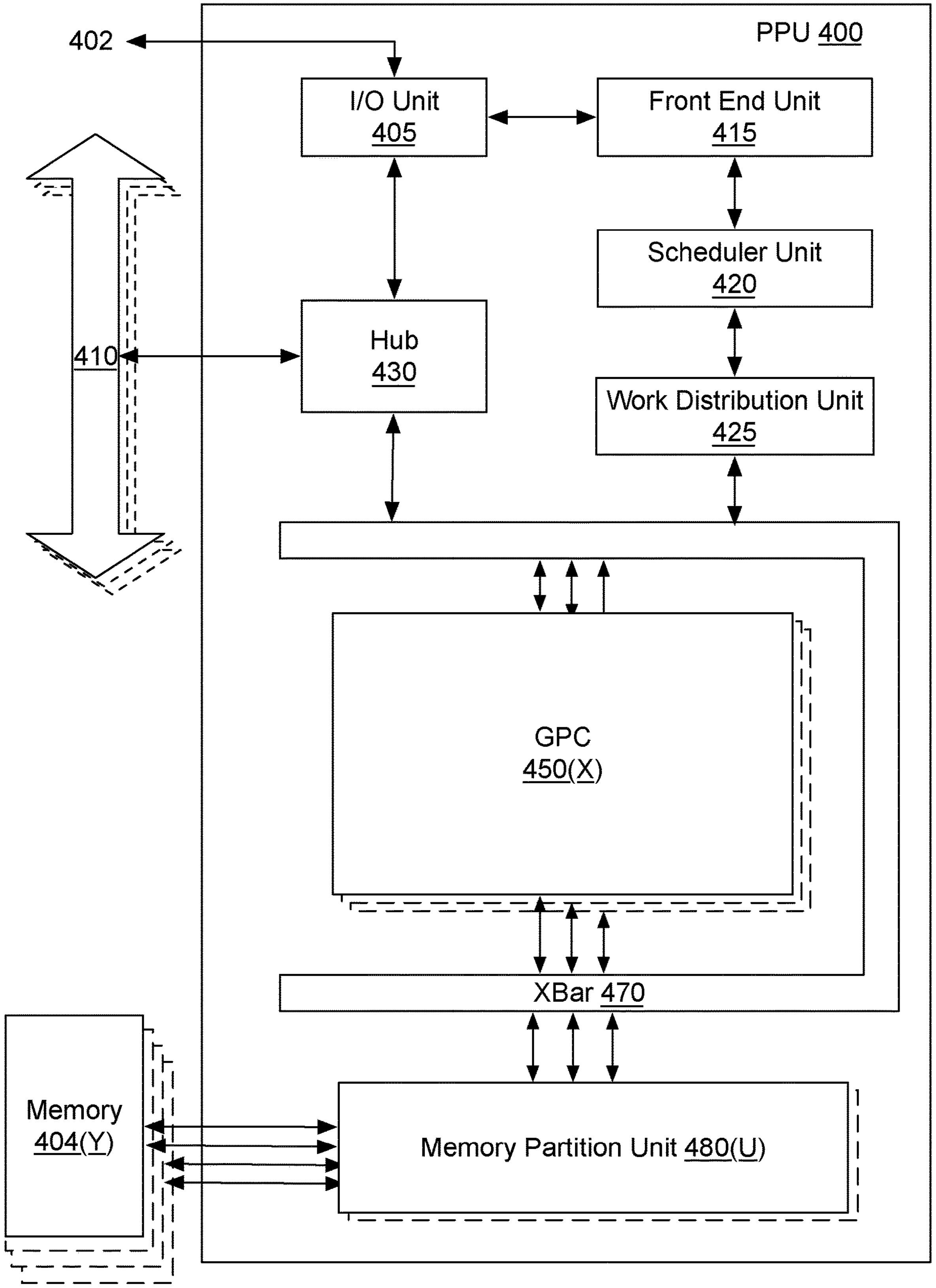
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement fast retraining of fully fused neural transceiver components, in accordance with an embodiment. In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
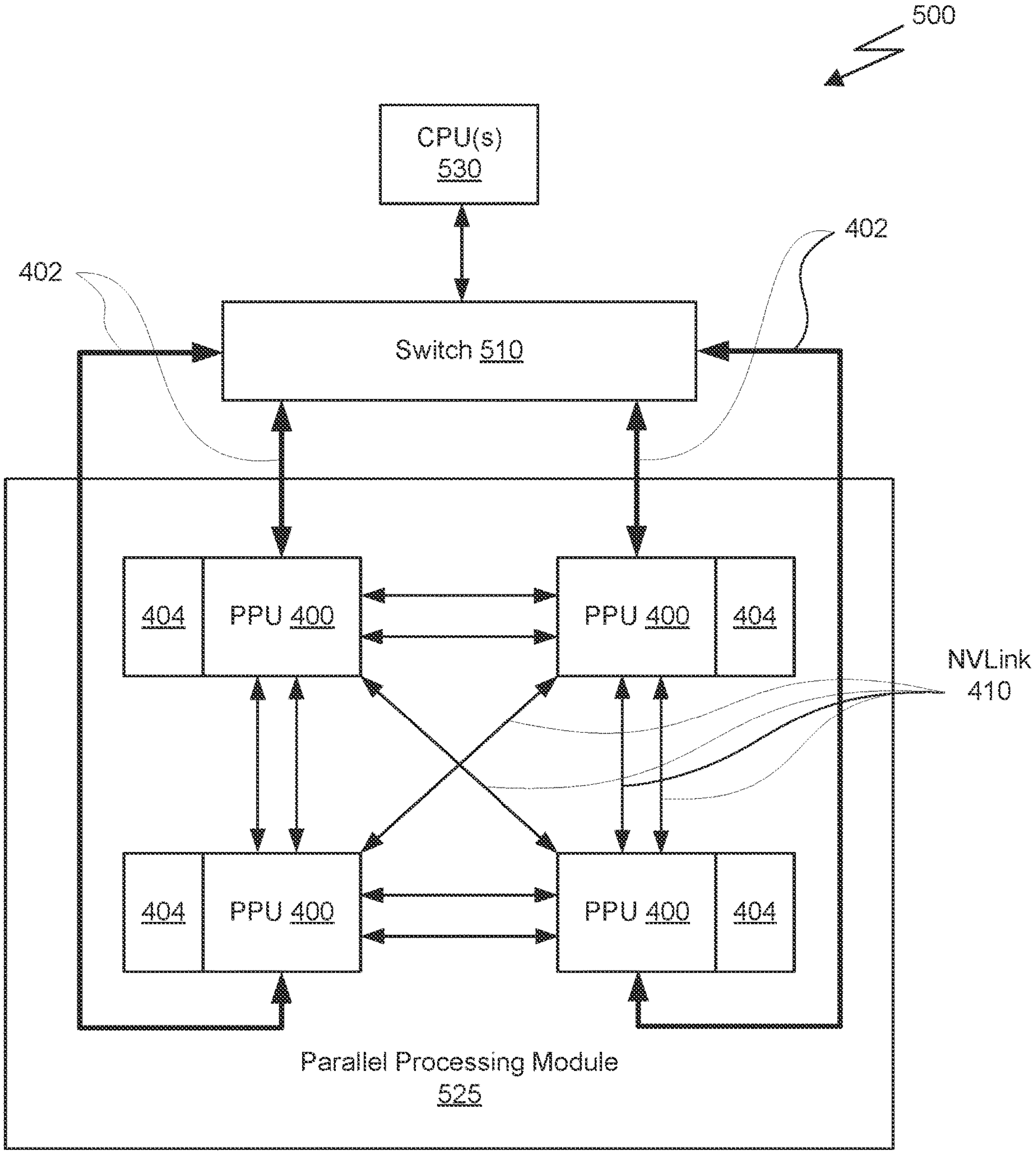
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The processing system 500 includes a CPU 530, switch 510, and multiple PPUs 400, and respective memories 404.

Figure 5B:
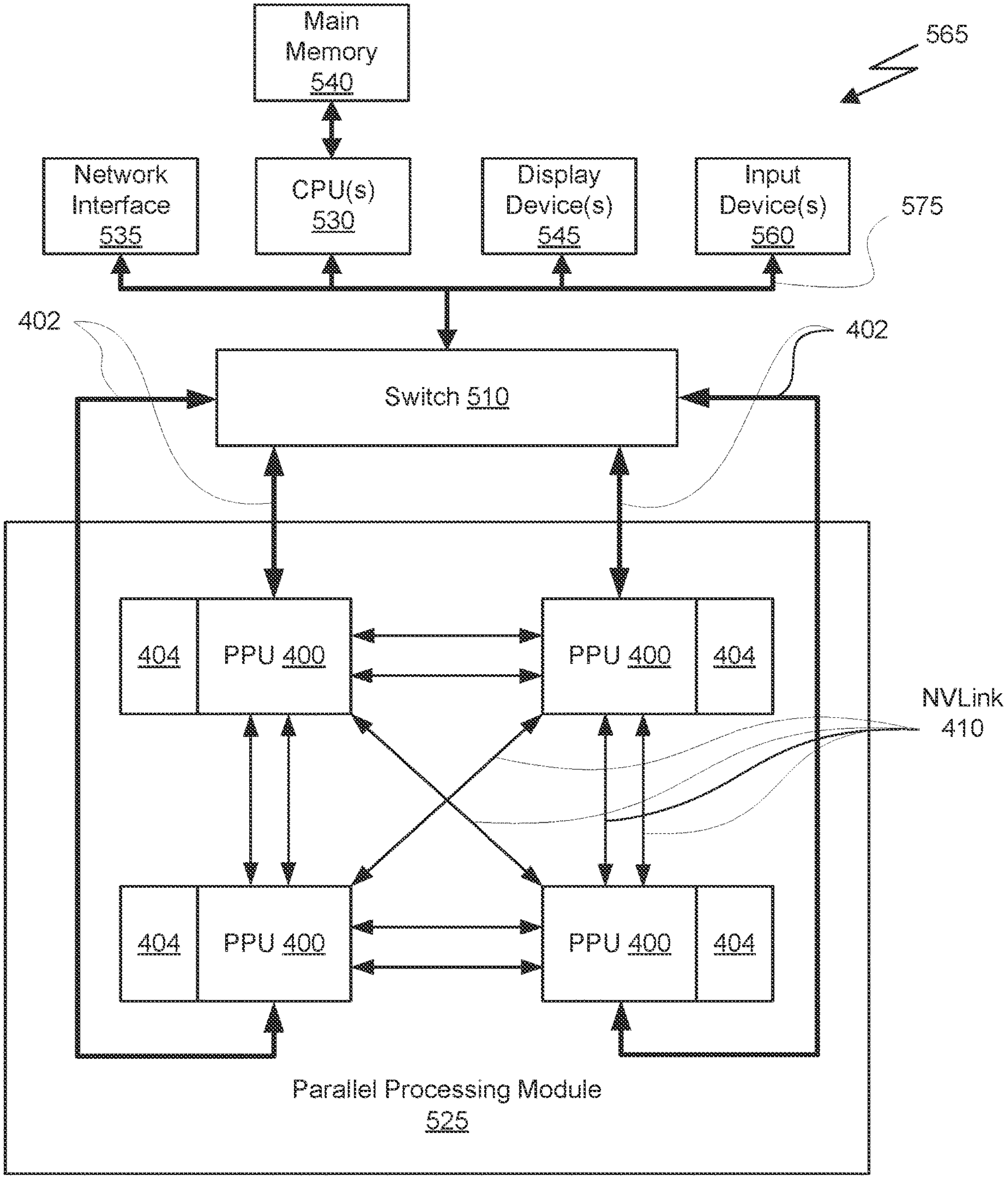
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet,". ".client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

Figure 5C:
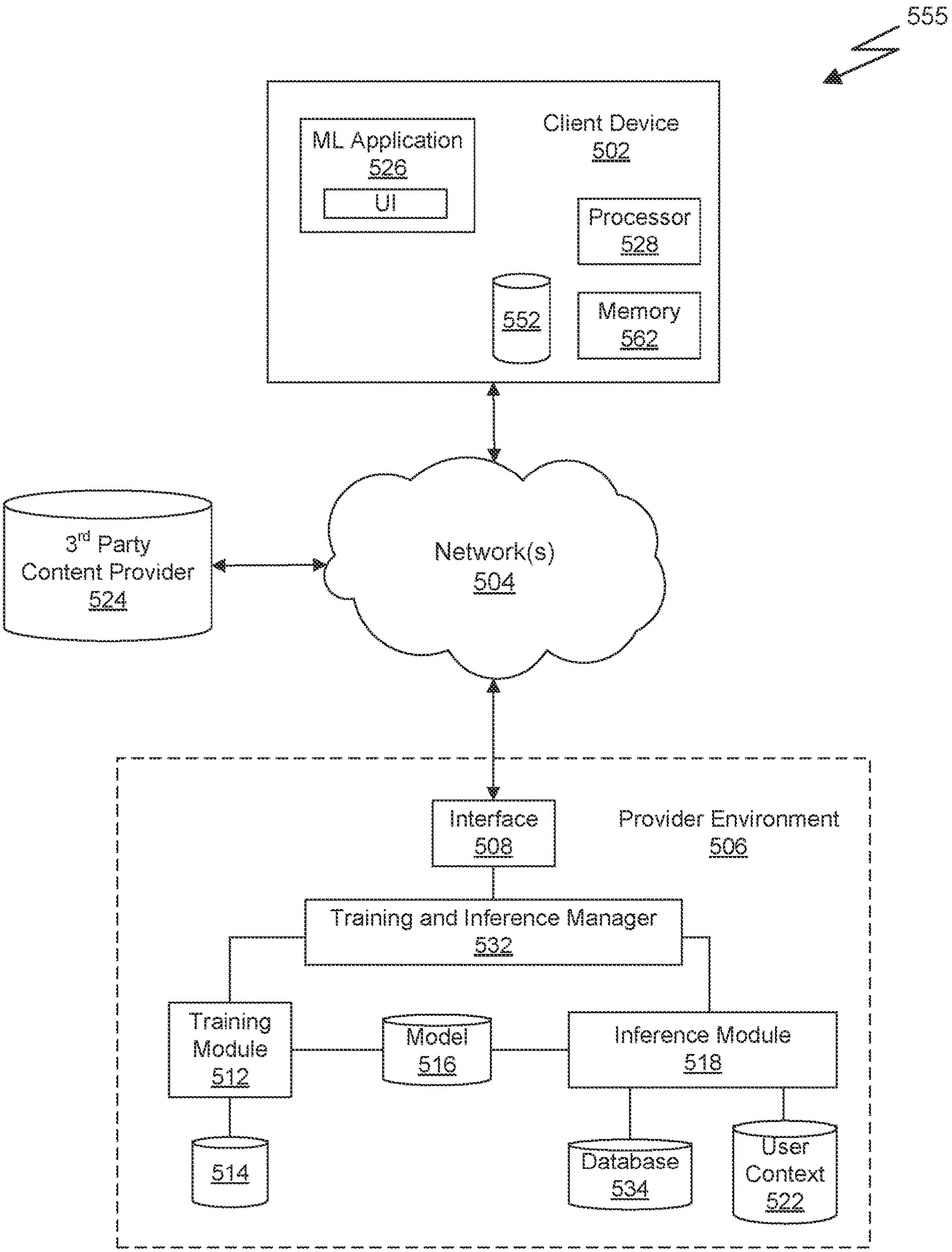
FIG. 5C illustrates components of an exemplary system that can be used to train and utilize machine learning, in at least one embodiment.

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Game Streaming System

Figure 6:
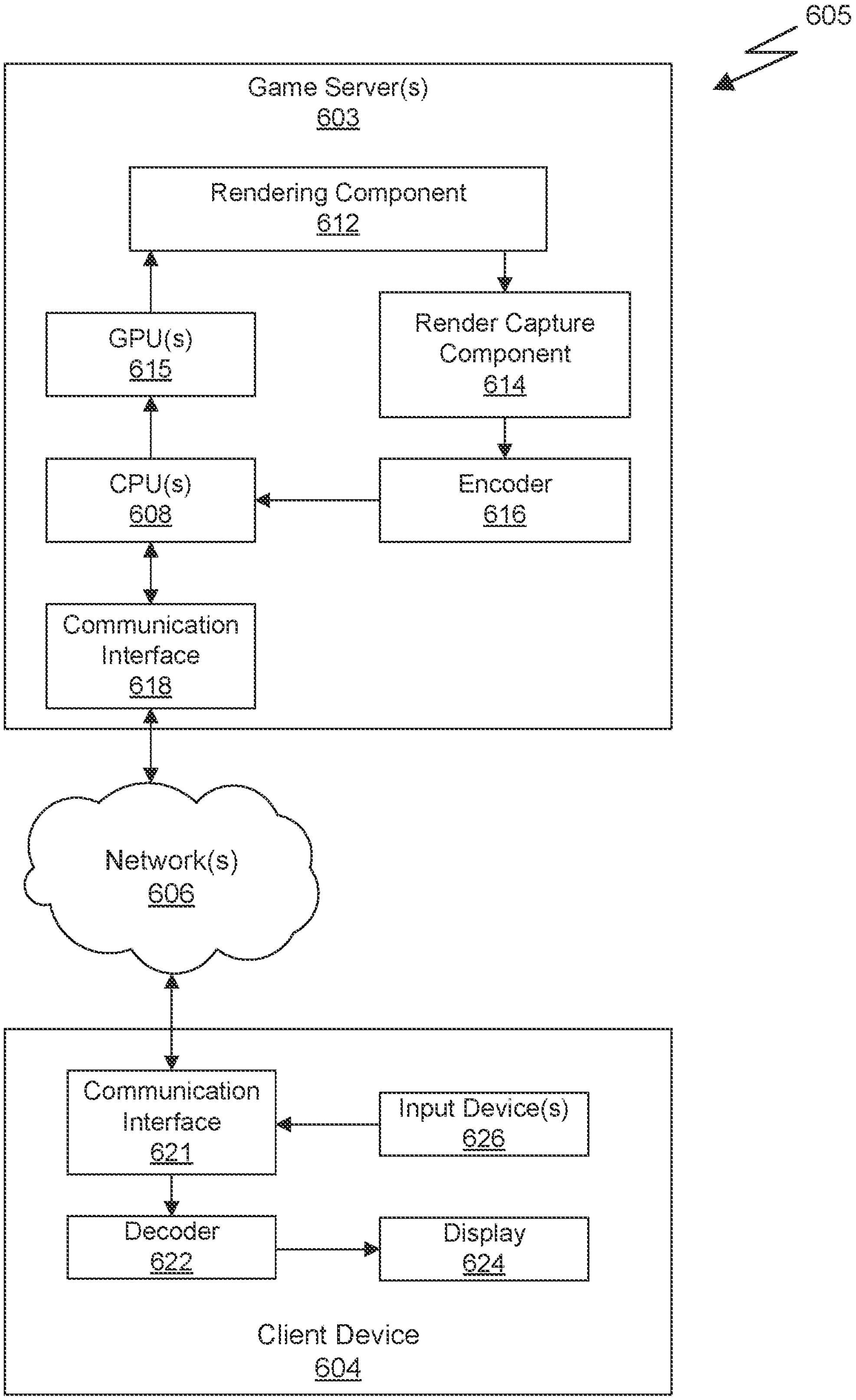
FIG. 6 is an example system diagram for a game streaming system, in accordance with some embodiments of the present disclosure.

FIG. 6 is an example system diagram for a game streaming system 605, in accordance with some embodiments of the present disclosure. FIG. 6 includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A communications apparatus, comprising:

a processor configured to perform a task associated with a receiver for communicating via a wireless channel by implementing a fully fused neural network, wherein the fully fused neural network is re-trained periodically by a re-training process comprising:

receiving, via the wireless channel, one or more frames of data, verifying, by performing a cyclic redundancy check, validity of the one or more received frames of data to obtain one or more verified frames, and updating one or more parameters of the fully fused neural network based on values of a loss determined from the one or more verified frames.

2. The communications apparatus of claim 1, wherein the processor comprises a parallel processing unit configured to implement the fully fused neural network, at least in part, using one or more tensor cores.

3. The communications apparatus of claim 1, wherein the fully fused neural network comprises a multi-layer perceptron (MLP) comprising at least one hidden layer, an activation layer, and an output layer.

4. The communications apparatus of claim 1, wherein the fully fused neural network is configured to generate log likelihood ratios (LLRs) of transmitted bits based on equalized symbols of an orthogonal frequency division multiplexing (OFDM) frame received by the receiver over the channel, wherein the OFDM frame consists of N subcarriers and K symbols per subcarrier.

5. The communications apparatus of claim 4, wherein the fully fused neural network comprises a multi-layer perceptron (MLP) configured to receive the equalized symbols $\hat{X}_{i,j}$ of the OFDM frame, a noise variance estimate $$\sigma_{i,j}^2$$

with each resource element of the OFDM frame, and a positional encoding p(i,j) of an index tuple (i,j) associated with each resource element as inputs and generate m LLRs for each equalized symbol of the OFDM frame, where $2^m$ is equal to an order of a constellation used in a quadrature amplitude modulation (QAM) modulation and coding scheme (MCS) used to communicate over the channel.

6. The communications apparatus of claim 4, wherein the one or more received frames of data are a plurality of orthogonal frequency division multiplexing (OFDM) frames, wherein the re-training process is performed using training data that comprises, for each respective OFDM frame of the plurality of OFDM frames, a set of tuples, wherein each tuple in the set of tuples comprises an equalized symbol for a particular resource element of the respective OFDM frame and corresponding valid bits for the equalized symbol, wherein the corresponding valid bits are generated by encoding information bits using forward error correction (FEC), and wherein the information bits are derived by a channel decoder based on the LLRs and confirmed as valid based on a cyclic redundancy check (CRC) using a last C bits of the information bits.

7. The communications apparatus of claim 6, wherein the updating the one or more parameters of the fully fused neural network is performed using stochastic gradient descent every $f$ OFDM frames, where $f$ is a positive integer.

8. The communications apparatus of claim 1, wherein the first fully fused neural network is configured to generate an estimate of a channel matrix based on a received resource grid of a t-th orthogonal frequency division multiplexing (OFDM) frame received via the wireless channel, wherein the OFDM frame consists of N subcarriers and K symbols per subcarrier.

9. The communications apparatus of claim 1, wherein the fully fused neural network is configured to generate an estimate of a three-dimensional tensor that represents information bits based on a received resource grid of a t-th orthogonal frequency division multiplexing (OFDM) frame received via the wireless channel, wherein the OFDM frame consists of N subcarriers and K symbols per subcarrier.

10. The communications apparatus of claim 1, the processor configured to implement, at least in part, a second neural network to perform a second task associated with the receiver, and wherein fully fused neural network performs a demapping task and the second neural network performs a channel estimation task, and wherein the fully fused neural network is configured to process, at least in part, an output of the second neural network as an input.

11. The communications apparatus of claim 1, wherein the communications apparatus communicates with a second communications apparatus over a channel, wherein the second communications apparatus comprises a transmitter and a second processor configured to implement, at least in part, a second neural network to perform a task associated with the transmitter of the second communications apparatus.

12. The communications apparatus of claim 11, wherein the transmitter is configured to transmit a sequence of known data to the receiver, wherein the values of the loss are values of a binary cross entropy loss between the known data and predicted log likelihood ratios (LLRs) generated by the fully fused neural network, wherein the one or more received frames of data are a plurality of orthogonal frequency division multiplexing (OFDM) frames, and wherein the fully fused neural network is configured to generate the predicted LLRs based on equalized symbols of the plurality of OFDM frames.

13. A communications system, comprising:

a first communications apparatus, comprising:

a processor configured to perform a task associated with a receiver for communicating via a wireless channel by implementing a fully fused neural network, wherein the fully fused neural network is re-trained periodically by a re-training process comprising:

receiving, via the wireless channel, one or more frames of data, verifying, by performing a cyclic redundancy check, validity of the one or more received frames of data to obtain one or more verified frames, and updating one or more parameters of the fully fused neural network based on values of a loss determined from the one or more verified frames.

14. The communications system of claim 13, wherein the fully fused neural network is configured to generate log likelihood ratios (LLRs) of transmitted bits based on equalized symbols of an orthogonal frequency division multiplexing (OFDM) frame received by the receiver over the channel, wherein the OFDM frame consists of N subcarriers and K symbols per subcarrier.

15. The communications system of claim 14, wherein the fully fused neural network comprises a multi-layer perceptron (MLP) configured to receive the equalized symbols $\hat{X}$i,j of the OFDM frame, a noise variance estimate $$\sigma^2_{i,j}$$

associated with each resource element of the OFDM frame, and a positional encoding p(i,j) of an index tuple (i,j) associated with each resource element as inputs and generate m LLRs for each equalized symbol of the OFDM frame, where $2^m$ is equal to an order of a constellation used in a quadrature amplitude modulation (QAM) modulation and coding scheme (MCS) used to communicate over the channel.

16. The communications system of claim 15, wherein the one or more received frames of data are a plurality of orthogonal frequency division multiplexing (OFDM) frames, wherein the re-training process is performed using training data that comprises, for each respective OFDM frame of the plurality of OFDM frames, a set of tuples, wherein each tuple in the set of tuples comprises an equalized symbol for a particular resource element of the respective OFDM frame and corresponding valid bits for the equalized symbol, wherein the corresponding valid bits are generated by encoding information bits using forward error correction (FEC), and wherein the information bits are derived by a channel decoder based on the LLRs and confirmed as valid based on a cyclic redundancy check (CRC) using a last C bits of the information bits.

17. The communications system of claim 16, wherein the updating the one or more parameters of the fully fused neural network is performed using stochastic gradient descent every $f$ OFDM frames, where $f$ is a positive integer.

18. The communications system of claim 13, wherein the fully fused neural network is configured to generate an estimate of a channel matrix based on a received resource grid of a t-th orthogonal frequency division multiplexing (OFDM) frame received via the wireless channel, wherein the OFDM frame consists of N subcarriers and K symbols per subcarrier.

19. The communications system of claim 13, wherein the fully fused neural network is configured to generate an estimate of a three-dimensional tensor that represents information bits based on a received resource grid of a t-th orthogonal frequency division multiplexing (OFDM) frame received via the wireless channel, wherein the OFDM frame consists of N subcarriers and K symbols per subcarrier.

20. The communications system of claim 13, the communications system further comprising a second communications apparatus comprising a transmitter, wherein the second communications apparatus further comprises a second processor configured to implement, at least in part, a second neural network to perform a task associated with the transmitter, wherein the transmitter is configured to transmit a sequence of known data to the receiver, and wherein the values of the loss are values of a binary cross entropy loss between the known data and predicted log likelihood ratios (LLRs) generated by the fully fused neural network, wherein the one or more received frames of data are a plurality of orthogonal frequency division multiplexing (OFDM) frames, and wherein the fully fused neural network is configured to generate the predicted LLRs based on equalized symbols of the plurality of OFDM frames.

21. A method, comprising:

periodically acquiring training data based on one or more frames received by a receiver of a communications apparatus, wherein the training data comprises sets of tuples comprising equalized symbols for the one or more frames and corresponding valid bit sequences for each of the equalized symbols, wherein the valid bit sequences are encoded via forward error correction applied to information bits that successfully passed a cyclic redundancy check (CRC) based on a last C bits of the information bits; and periodically re-training, using the periodically acquired training data for a number of frames, a fully fused neural network configured to perform a task associated with the receiver.

22. The method of claim 21, wherein the re-training is performed over a number B of iterations, each iteration corresponding to a batch of index tuples (i,j) drawn either deterministically or randomly from $\mathcal{D}$, where $\mathcal{D}$ is the set of all index tupes (i,j) corresponding to resource elements in the frames that carry valid data.

23. A method for end-to-end training of an auto-encoder, wherein the auto-encoder comprises a first neural network corresponding to a transmitter of a first communications apparatus and a second neural network corresponding to a receiver of a second communications apparatus, the method comprising:

initializing parameters of the first neural network and the second neural network;

transmitting, via the transmitter, a sequence of known data to the receiver;

generating, via the receiver, a set of equalized symbols in response to the transmitted sequence of known data;

training the second neural network based on a binary cross entropy loss between the sequence of known data and predicted log likelihood ratios (LLRs) generated by the second neural network based on the set of equalized symbols, wherein the second neural network is a fully fused neural network;

transmitting, via the transmitter, a second sequence of known data, wherein the transmitter is configured to perturb the output of the transmitter in accordance with a perturbation noise;

receiving, by the transmitter, a feedback loss signal from the receiver;

calculating a second loss signal based on the feedback loss signal and the perturbation noise; and training the first neural network based on the second loss signal.

24. The method of claim 23, wherein the training of the second neural network and the first neural network are repeated periodically in accordance with a termination criterion.

* * * * *